United States Patent
Connor et al.

(10) Patent No.: US 6,899,141 B2
(45) Date of Patent: May 31, 2005

(54) REHABILITATION OF WATER SUPPLY PIPES

(75) Inventors: Raymond Connor, Buxton (GB); Simon Daniels, Gatesheat (GB)

(73) Assignee: Suez Lyonnaise des Eaux, Nanterre Cedex (FR)

(*) Notice: Subject to any disclaimer, the term of this patent is extended or adjusted under 35 U.S.C. 154(b) by 29 days.

(21) Appl. No.: 10/674,500

(22) Filed: Oct. 1, 2003

(65) Prior Publication Data

US 2004/0144441 A1 Jul. 29, 2004

Related U.S. Application Data

(62) Division of application No. 09/958,901, filed as application No. PCT/EP00/04174 on Apr. 14, 2000, now Pat. No. 6,644,356.

(30) Foreign Application Priority Data

Apr. 15, 1999 (GB) .............................................. 9908602

(51) Int. Cl.⁷ .................................................. F16L 9/14
(52) U.S. Cl. ....................... 138/146; 138/98; 428/36.91
(58) Field of Search ............................ 138/97, 98, 146, 138/141; 428/36.91

(56) References Cited

U.S. PATENT DOCUMENTS

| | | | | |
|---|---|---|---|---|
| 4,373,554 A | * | 2/1983 | Cook | 138/137 |
| 4,707,413 A | * | 11/1987 | Kehr et al. | 428/440 |
| 4,771,090 A | * | 9/1988 | Kehr et al. | 524/68 |
| 5,571,585 A | * | 11/1996 | Yoshida et al. | 428/36.91 |
| 5,614,315 A | * | 3/1997 | Kondo et al. | 428/332 |
| 5,874,139 A | * | 2/1999 | Bosiers et al. | 428/35.2 |
| 6,187,402 B1 | * | 2/2001 | Ek et al. | 428/36.91 |
| 6,207,754 B1 | * | 3/2001 | Yu | 525/133 |
| 6,306,969 B1 | * | 10/2001 | Patel et al. | 525/191 |
| 6,645,588 B1 | * | 11/2003 | Leiden et al. | 428/35.8 |
| 6,656,401 B1 | * | 12/2003 | Knauf | 264/146 |
| 6,660,360 B2 | * | 12/2003 | Mertzel et al. | 428/122 |

* cited by examiner

*Primary Examiner*—James Hook
(74) *Attorney, Agent, or Firm*—Connolly Bove Lodge & Hutz LLP

(57) ABSTRACT

A water supply pipe has a tubular liner of a polyolefin elastomer/plastomer installed therein. The polyolefin elastomer/plastomer includes a substantially linear ethylene inter-polymer with a narrow molecular weight distribution from 1.8 to 2.2.

3 Claims, 2 Drawing Sheets

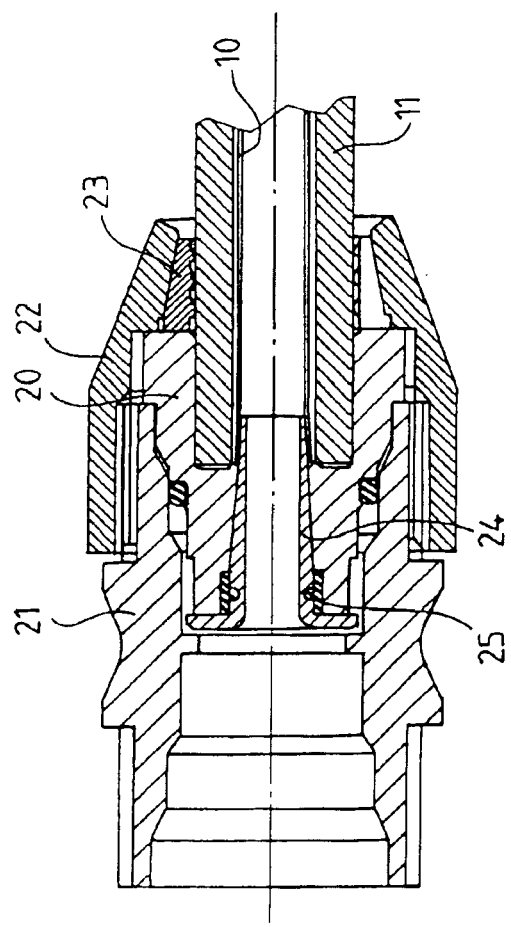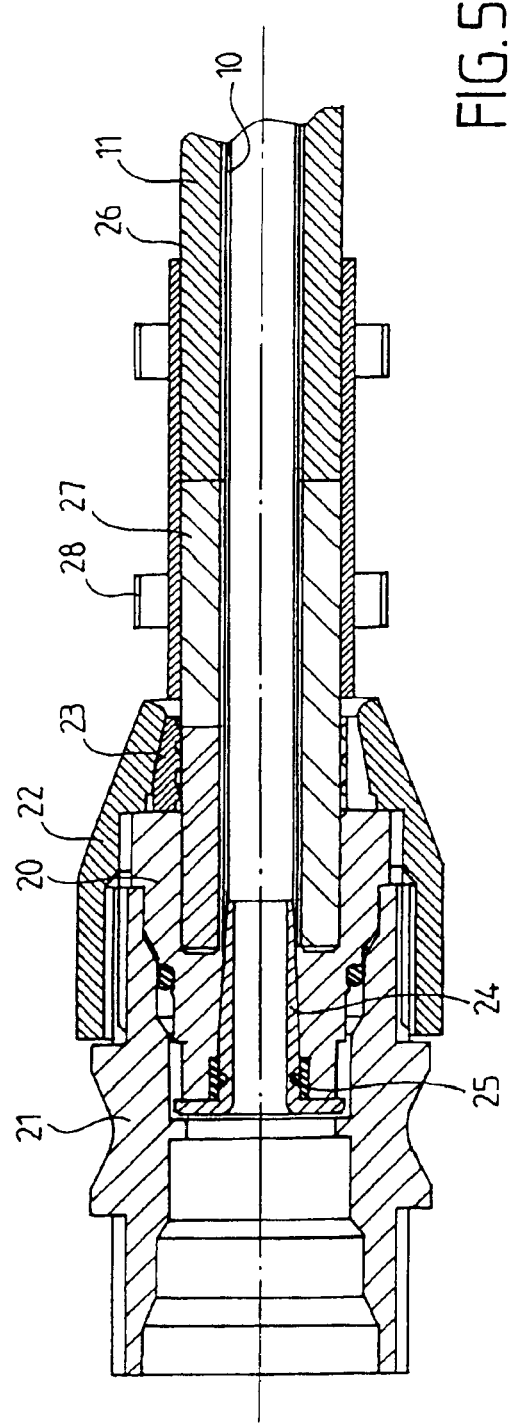

REHABILITATION OF WATER SUPPLY PIPES

This application is a divisional application of U.S Ser. No. 09/958,901 filed Jan. 22, 2002, now U.S. Pat. No. 6,644,356.

FIELD OF THE INVENTION

This invention relates to inprovements in the rehabilitation of water supply pipes.

BACKGROUND OF THE INVENTION

Domestic water supply systems are usually connected to the water company's main by a service pipe, in two parts, the water company's pipe making an end to end junction with the customer's pipe at the highway boundary. A major public health problem remains the large number of premises which are still equipped with lead pipes, as the slightly soluble lead is a well known cumulative poison. One approach to this problem has been to replace lead piping with polyethylene plastics tubing. Alternative ductile metals such as copper have their own cumulative hazards.

As an alternative to replacement of lead pipes, it has been proposed to line the pipes with a polyethylene film which is everted by fluid pressure into the pipe (see WO97/04269) or a polyethyleneterephtalate (PET) film which is extruded as a profile and inflated by fluid pressure when heated in situ. This presses the lining against the inner walls of the pipe, and softens the lining to achieve a measure of thermal bonding to the pipe wall.

The known techniques all involve significant investment in capital plant and equipment, including those outlined above and also the use of impact moles (usable in compactable soils but not capable of being steered around obstructions such as other utility conduits gas, sewage, electricity, etc. . . ), pipe pulling, pipe splitting, guided drilling, pipe pushing, narrow trenching rods and powerful vacuum excavators.

BRIEF DESCRIPTION OF THE INVENTION

An object of the present invention is to provide a simpler and cheaper trenchless method by which existing lead water pipes, particularly underground pipes, can be rehabilitated with the minimum of disruption to the customer's property and without the need for expensive plant and equipment.

According to the invention, there is provided a method of rehabilitating water supply pipes comprising deploying a tubular liner within a pipe, characterized in that the liner comprises a polyolefin elastomer or a polyolefin plastomer. A polyolefin elastomer has a density below 870 kg/m$^3$, whereas polyolefin plastomer has a density above 870 kg/m$^3$.

The invention also provides water supply pipes which comprises a tubular liner of a polyolefin elastomer or plastomer and an apparatus for making water supply pipe and using the method of rehabilitating water supply pipes.

The polythene elastomer/plastomer preferably comprises a substantially linear ethylene interpolymer, which may comprise 50–95% by weight of ethylene, and 5–50% by weight of at least one olefinic co-monomer, preferably 10–25% by weight of the co-monomer. Co-monomers may contain from 3 to about 20 carbon atoms, and may comprise one or more of propylene, 1-butene, 1-hexene, 4-methyl-1-pentene, 1-heptene, and 1-octene. The density range may be in the range of 830 to 967 kg/m$^3$, preferably 863 to 913 kg/m$^3$ and more preferably 885 to 913 kg/m$^3$, for optimum toughness and flexibility. Preferred co-monomers are 1-hexene, and especially 1-octene.

The substantially linear inter-polymers are advantageously characterized by a narrow molecular weight distribution, especially from 1.8 to 2.2 and a homogenous co-monomer distribution.

The tubular liner preferably is formed as a pleated tube formed with longitudinally extending multiple radial pleats, giving a star shaped multilobed or fluted cross-section. The tube is preferably formed with six radially equispaced pleats, defining an equal number of outwardly projecting lobes.

The liner may be deployed within a pipe, by securing one end of the liner adjacent an end of the pipe to which access has been obtained, and pulling the liner through the pipe by means of a line which may be attached to a foam messenger pig and propelled through the pipe by fluid pressure. Alternatively the liner may be pushed and pulled through the host pipe by means of a flexible rod attached to the liner.

The liner is preferably extruded in the pleated tube form from the polyolefin elastomer/plastomer, and has an outer diameter significantly smaller than the internal diameter of the pipe to be rehabilitated.

The liner may be die drawn during the extrusion process whilst the material is at just below the crystallisation melt temperature of the polymer, to impart a significant reduction in size of the extrusion as compared with the die, and also produces significant orientation of the polymer in the axial direction of the extrusion. This orientation in the direction of extrusion provides stiffness and resistance to kinking.

BRIEF DESCRIPTION OF THE DRAWINGS

A preferred embodiment of the liner and rehabilitation method according to the invention will now be further described by way of example, with reference to the accompanying drawings, wherein:

FIG. 4 is a sectional view taken along the axis of the pipe, of a first terminal arrangement for enclosing an end of the liner during installation;

FIG. 5 is a similar view of a second terminal arrangement for enclosing an end of the liner during installations.

DETAILED DESCRIPTION OF THE INVENTION

Figure 1:
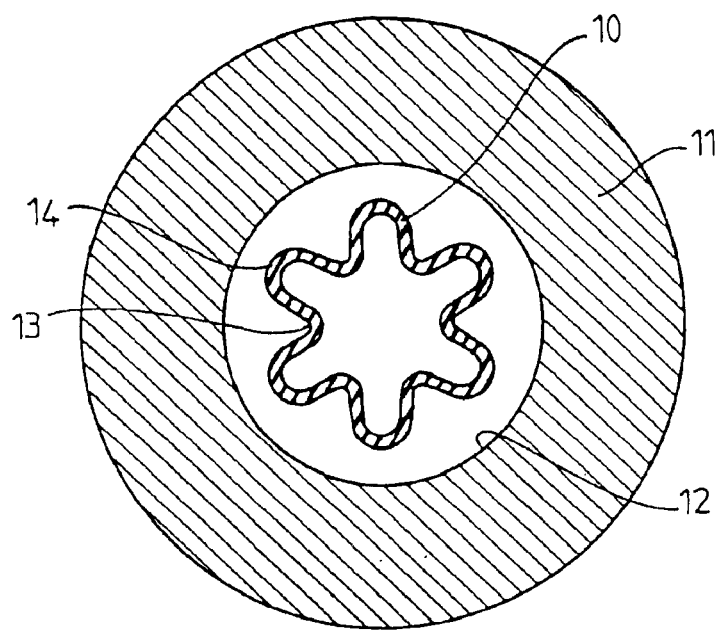
FIG. 1 is an enlarged sectional view of a liner according to the invention deployed within a domestic water supply pipe

The liner 10 is shown in FIG. 1 inserted axially within a lead water pipe 11, having an inner wall 12. The liner 10 comprises an extrusion of a polyolefin elastomer or plastomer, such as a substantially linear ethylene interpolymer, of a kind to be described in more detail below.

The liner 10 has a generally star-shaped or lobed cross-sectional shape, provided by six longitudinally extending pleats 13, and six ribs 14.

The diameter, measured between opposed rib crests is about 8 mm, which enables the liner to be inserted easily within the bore of a lead domestic water pipe, which is typically from 10 to 20 mm internal diameter.

This shape and dimension enables the liner to be deployed axially along the pipe, and to negotiate bends in the pipe, without twisting or kinking.

Figure 2:
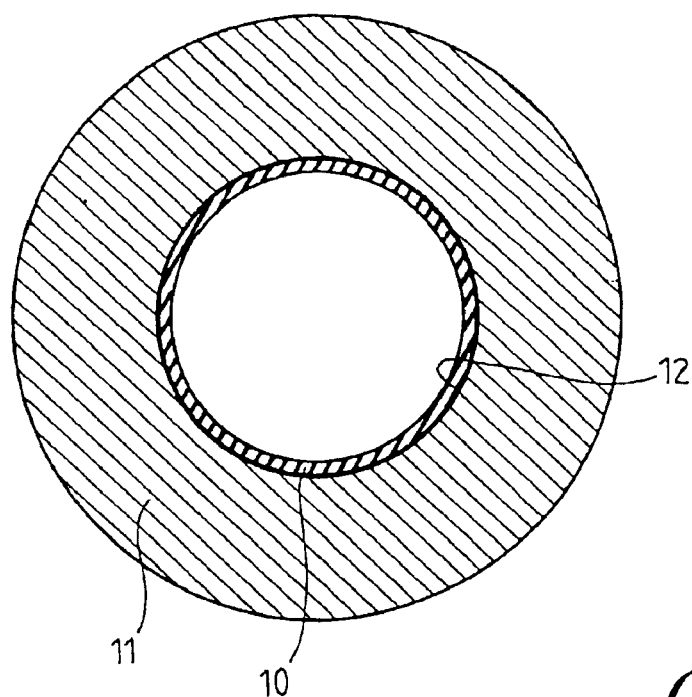
FIG. 2 is a similar enlarged sectional view of the liner of FIG. 1 expanded by internal pressure so as to be forced into contact with the inner wall of the pipe.

FIG. 2 shows the pipe 11 and liner 10 after inflation of the liner by internal pressure such as that afforded by water supply pressure, so that the elastomeric lining expands, and is maintained in contact with the inner wall 12 of the pipe by the water pressure.

FIGS. 4 and 5 show two embodiments of device for enclosing one end of the liner 10 at the accessible end of a pipe 11 during deployment of the lining into the pipe. In FIG. 4, the end of the pipe 11 is received at an abutment in an outer adaptor 20 which is received in the open end of a coupling 21, and secured about the pipe end by a compression nut 22 screwed to the coupling 21 and to the pipe end by a grip ring 23.

An inner adaptor, in the form of a tapered member 24 receives an end of the liner 10 and clamps it with a seal ring 25 in cooperation with an inner face of the outer adaptor 20.

The FIG. 5 embodiment has all these features, but differs in that the end of pipe 11 is held by a locking collar 26 to a stub shaft 27 which is held by the compression nut 23, by means of clips 28.

The liner 10 in the preferred embodiment is a tubular extrusion of a polyolefin elastomer or plastomer. This is produced from a substantially linear ethylene inter-polymer such as described in U.S. Pat. No. 5,272,236, U.S. Pat. No. 5,278,272, and U.S. Pat. No. 5,380,810. Such polymers are supplied, e.g., by DuPont Dow Elastomers S.A. ("substantially linear" means that the bulk polymer has an average of 0.01 to 3.0 long chain branches per 1000 carbon atoms, preferably from 0.01 to 1.0 long chain branches per 1000 carbon atoms). Polymers with fewer than 0.01 long chain branches per 1000 carbon atoms are described as "linear".

The ethylene inter-polymer preferably contains 50–95% by weight of ethylene and 5–50% by weight of at least one alpha-olefin co-monomer, preferably 10–25% by weight of co-monomer. The percentage of co-monomer is measured by infra red according to ASTM D-2238. The alpha-olefin may have up to about 20 carbon atoms, for example propylene, 1-butene, 1-hexene, 4-methyl-1pentene, 1-heptene and 1-octene are especially preferred, more especially 1-octene for use in the liner. The thus produced inter-polymers are characterized by a narrow molecular weight distribution and by a homogenous co-monomer distribution. The molecular weight distribution (Mw/Mn) measured by GPC (Gel Permeation Chromatography) is defined by the equation Mw/Mn ($I_{10}/I_2$)–4.63. The preferred density range of the interpolymer is from 863 to 913 km/m$^3$ because the liner is flexible and yet has an excellent burst strength due to tie chain molecules.

One suitable liner material has the following specifications:

| Physical Properties | Test | |
|---|---|---|
| Co-monomer Content, wt % | 9.5 | Dow |
| Melt Index dg/min | 1.0 | ASTM D-1238 |
| density g/cm$^3$ | 0.908 | ASTM D-792 |

-continued

| | Test | |
|---|---|---|
| Moulded Properties | | |
| Ultimate Tensile Strength MPa | 33.0 | ASTM D-638M-90 |
| Flexural Modulus, 2% Secant MPa | 141 | ASTM D-790 |
| Ultimate Tensile Elongation % | 700 | ASTM D-638M-90 |
| Hardness, Shore A/D | 96/49 | ASTM D-2240 |
| Thermal properties | | |
| Vicat softening Point ° C. | 97 | ASTM D-1525 |
| DSC Melting Point | 103 | DuPont/Dow |

The polymers are produced using, for example, the INSITE TECHNOLOGY (DuPont Dow Elastomers SA, Registered Trade Mark), a process which allows control over polymer structure, properties and rheology. By controlling molecular architecture, INSITE (TM) makes possible a very narrow molecular weight distribution and controlled level of crystallinity, leading to key advantages such as control of flexibility, hardness, elasticity, compression set and heat resistance. These properties can be further improved by compounding and the use of fillers, and cross-linked using silane, peroxide or UV or other radiation.

Typical properties of a polyolefin elastomer/plastomer are summarised as follows:

| | |
|---|---|
| density (g/cm$^3$), ASTM D-792 | 0.864–0.913 |
| Flexural Modulus, 2% Secant, Mpa, ASTM D-790 | 7–190 |
| 100% Modulus, Mpa, ASTM D-412 | 1 to 5 |
| Elongation, %, ASTM D-638 | 77+ |
| Melting Point, ° C. | 50–100 |
| Hardness, Shore A, ASTM D-1003 | 10–20 |
| Melt Index, 12, ASTM D-1238, dg/min | 0.5–30 |
| Low Temperature Brittleness, T, ASTM D-746 | Below –76 |

The polymer can be processed in the same way as a thermoplastic and performs as an elastomer/plastomer.

The liner made from this material takes advantage of the properties of the polymer especially elasticity which allows for considerable radial expansion under pressure, coupled with an increase in the flow rate due to the excellent processability of the polymer.

The density of the preferred material is in the range of 902 to 908 kg/m$^3$, tensile strength from 32–33 Mpa, and ultimate elongation up to 800%.

However, the higher density material has been found to perform most satisfactory.

Figure 3:
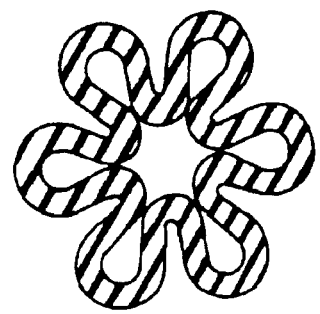
FIG. 3 is a fragmentary sectional view of the liner as shrunk after die drawing.

The liner 10 is extruded by using a vacuum calibration die to produce a profile with a wall thickness from 0.25–0.55 mm and to fit lead water pipes of 0.5 inch and 0.75 inch (12.5 and 20 mm) internal diameter. It is also designed to expand radially under pressure while retaining its structural and geometrical integrity and be able to recover its shape even after the collapse under vacuum. The liner is die drawn during extrusion while the material is just below the crystallization melt temperature. This enables the liner to be reduced significantly in size (e.g. from 12 to 6–8 mm) and also produces significant orientation of the polymer in the axial direction of extrusion. The form of the reduced die drawn liner is shown in FIG. 3, which is a cross section of the liner 10 showing that the pleats are drawn in-together until their inner surfaces abut. This figure is not to the same scale as FIGS. 1 and 2 and the shrunken liner of FIG. 3 is of much lesser diameter than the liner 10 of FIG. 1.

When installing the lining the pipe 11 is thoroughly cleaned by a suitable cleaning method, for example by pumping clean water through the pipe by means of a portable water container fitted with a pressurized pump attachment. This method has been shown to be useful in washing out deposits such as oxides which can accumulate in the lead pipe, from the iron water mains. The water also acts as a suitable lubricant for insertion of the liner; other methods of cleaning such as blowing cleaning sand through the pipeline, or by use of cleaning rods with appropriate attachments may be used. Access is gained to the pipe by way of a stop cock or chamber boundary box. A pig may then be blown through the pipe 11 with a line attached to be used as a leader for pulling the liner 10 through the pipe for up to 30 or more. Alternatively, a flexible rod may be attached to the liner for moving the liner into the pipe. When the liner is in place, the pipe is reconnected. Pressure of water in the pipe during use will expand and retain the liner in place, and the liner will prevent contamination of the water by the metal of the pipe. The liner 10 is made of a selected grade of polyolefin elastomer or plastomer, with a wall thickness of between 260–500 or more microns, or sufficient to maintain the liner's geometric integrity within an existing underground host pipe without collapse.

The use of elastomeric material to form the liner gives substantial advantages, as the liner can be introduced as a small diameter insert which is expanded by application of internal pressure, and has good resilience and elasticity which are advantageous during introduction of the lining to the pipe.

The method and materials described provide a method of rehabilitating small diameter pipes which is free from many of the problems found in the prior art and provide protection against erosion, corrosion, lead contamination and deposits of solids (scaling or furring) on the inner surface of the pipe.

No heat activation of the polymer is required, and the liner has mechanical strength lacking in some proposed film liner's. Also the need to use expensive plant and machinery is significantly reduced.

The liner is able to expand and contract under hydrostatic pressure and is not subject to kinking or twisting even when fed along pipes incorporating bends, and it is able to maintain its original shape around bends in the flow pipe.

The die drawn liner also has torsional rigidity due to the compacting of the pleat due to the die drawing. The liner also has a self supporting geometrical structure and functions as a hydrostatic valve membrane due to its elasticity. All these attributes and advantages arise from the use of the polyolefin elastomer material, the radiated pleated cross-section and the step of die drawing of the liner as it is extruded.

What is claimed is:

1. Water supply pipe comprising a tubular liner of a polyolefin elastomer/plastomer, wherein the polyolefin elastomer/plastomer comprises substantially linear ethylene interpolymer, wherein the polyolefin elastomer/plastomer has a narrow molecular weight distribution from 1.8 to 2.2, and wherein said interpolymer comprises 50–95% by weight of ethylene, and 5–50% by weight of at least one olefinic co-monomer.

2. Water supply pipe according to claim 1, wherein the co-monomer has from 3 to 20 carbon atoms.

3. Water supply pipe according to claim 2, wherein the comonomer is any one or more of propylene, 1-butene, 1-hexene, 4-methyl-1-pentene, 1-heptene and 1-octane.

* * * * *